Feb. 11, 1941.  W. MARTINO  2,231,191
ANIMAL TRAP
Filed Nov. 27, 1939
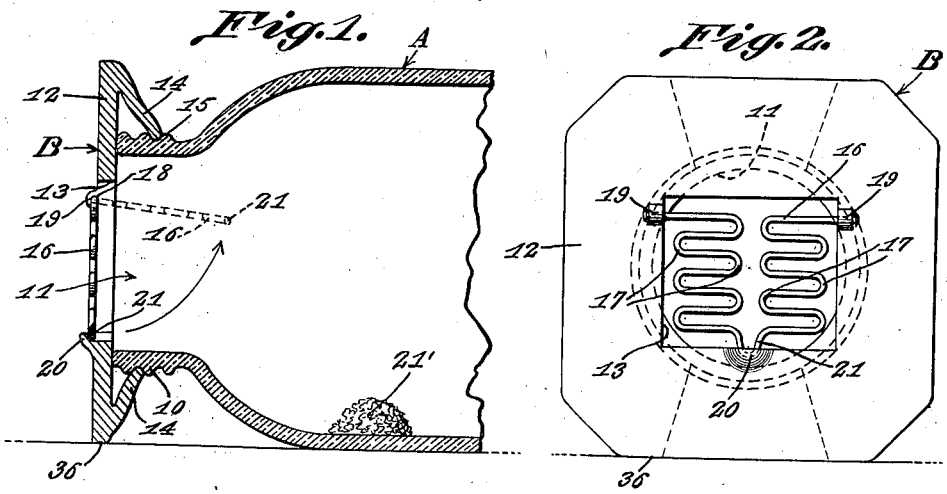
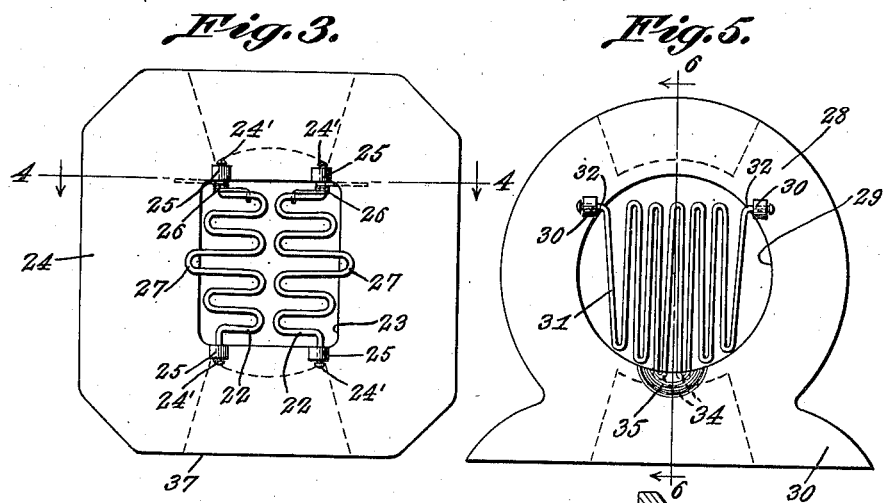
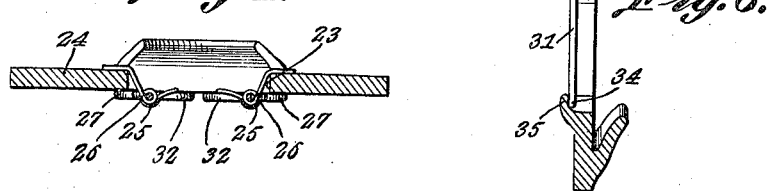
William Martino, INVENTOR
BY Victor J. Evans & Co.
ATTORNEYS Patented Feb. 11, 1941

2,231,191

UNITED STATES PATENT OFFICE 2,231,191

ANIMAL TRAP

William Martino, Detroit, Mich.

Application November 27, 1939, Serial No. 306,398

1 Claim. (Cl. 43—66)

The invention relates to an animal trap and more especially to a rodent trap attachment for jars or the like.

The primary object of the invention is the provision of an attachment of this character wherein the same when applied to the open mouth of a jar or the like, for example, a "Mason" jar, the latter will be converted into a rodent trap, being especially designed for the trapping of mice. The said attachment is readily and easily applied to and removed from the jar and when applied will maintain such jar in a fixed position and through bait interiorly thereof rodents, particularly mice, will be enticed within for the trapping of the same.

Another object of the invention is the provision of an attachment of this character wherein its construction enables the fitting thereof upon a glass jar for the trapping of animals, rodents or the like therein, the attachment being of novel construction and will eliminate any possibility of the escaping of an animal or rodent therefrom after entering the same.

A further object of the invention is the provision of an attachment of this character wherein a trapping gate, door or the like is so mounted that it can be opened by an animal for the entrance of the latter into a jar or the like and will constitute a barrier to prevent escape of the animal after trapping thereof.

A still further object of the invention is the provision of an attachment of this character, which is extremely simple in its construction, thoroughly reliable and efficient in operation, possessing few parts, thoroughly sanitary, easy of application to and removal from a jar or the like, and inexpensive to manufacture.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claim hereunto appended.

In the accompanying drawing:

Figure 1 is a fragmentary vertical sectional view of an attachment constructed in accordance with the invention and in association with a jar.

Figure 2 is a front elevation of the attachment.

Figure 3 is a view similar to Figure 2 showing a modification.

Figure 4 is a sectional view taken on the line 4—4 of Figure 3 looking in the direction of the arrows.

Figure 5 is a view similar to Figure 3 showing a further modification.

Figure 6 is a sectional view taken on the line 6—6 of Figure 5 looking in the direction of the arrows.

Similar reference characters indicate corresponding parts throughout the several views in the drawing.

Referring to the drawing in detail, particularly Figures 1 and 2, A designates generally a portion of a glass jar, being preferably of the "Mason" fruit jar type, having an externally threaded neck 10 at the open end or mouth of the jar, the open end or mouth being indicated at 11. To this end or mouth 11 is detachably fitted the attachment, denoted generally at B, constituting the present invention.

The attachment B comprises a flat-faced capping section or panel 1 having centrally thereof an opening 13 of proper size for the admission therethrough of animals or rodents into the jar A. This opening 13 is adapted to register with the open end or mouth 11 of the jar body A when the section or panel 12 is disposed against the open end or mouth 11 in the position as shown in Figures 1 and 2.

At the rearmost face of the section or panel 12 are outwardly convergent opposed thread-engaging lips 14, which are adapted to follow the threads 15 exteriorly on the open end or mouth 11 so that the panel or section 12 will be separately fastened in contacting relation to the said end or mouth 11 similarly as exhibited in Figure 1 of the drawing.

Arranged in confronting relation to the opening 13 in the section or panel 12 is a swingable gate or door 16, being made from a single length of wire bent on itself for the proper spread of this gate or door for the coverage of the opening 13 and such spread is created by the bights or loops 17. The gate or door 16 is swung by pintle ends 18 made from the single wire from which the gate or door is created. These pintle ends 18 in horizontal alignment with each other are journaled in bearing eyes 19 on the section or panel 12 for the swinging of the gate or door on a horizontal axis at the upper end thereof and uppermost to the opening 13 in the section or panel 12.

At a lowermost point and centered with relation to the opening 13 there is provided on the section or panel 12 an outwardly directed stop lip 20 engageable by a striker bight 21 provided on the gate or door 16 and in this manner the latter can swing inwardly of the jar A to an open position but will be prevented from swinging outwardly to an open position, the said gate or door being stopped against outwardly swinging from its closed position shown by full lines in Figure 1 of the drawing.

The gate or door 16 allows entrance of an animal or rodent into the jar for the trapping thereof without liability of the escaping of the animal or rodent after being trapped. Adapted to be placed within the jar A is a bait 21' for enticing the animal or rodent for the trapping thereof.

In Figures 3 and 4 of the drawing there is shown a modification of the invention wherein double gates or doors 22 are located in confronting relation to the opening 23 in the section or panel 24 and these swing horizontally on vertical axes created by the pintle ends 24' journaled in the bearings 25 on the said section or panel 24. The gates or doors 22 are acted upon by springs 26 which hold the same normally closed while such gates or doors have bent from the wires from which the same are made lateral bights or loops 27 which constitute stops engageable with the section or panel 24 to prevent the gates or doors 22 opening outwardly yet they are free to swing inwardly to open position for the admission or entrance of an animal or rodent into the jar A when the panel or section 24 is attached thereto similarly to the attachment of the gate or panel 12 hereinbefore set forth.

In Figures 5 and 6 of the drawing there is shown a further modification of the invention wherein the section or panel 28 having the central opening 29 is of partial disk formation provided with a foot 30 for contact with a support to hold the jar A against rolling action and in a fixed position for trapping purposes.

The gate or door 31 is made from a single length of wire reversely folded on itself and providing pintle terminals 32, these being journaled in bearings 33 on the section or panel 30. The pintle terminals 32 are journaled so that the gate or door 31 will swing on a horizontal axis. The gate or door 31 has the intermediate folds extended to form stop bights or loops 34 engageable with a stop lip 35 created on the panel or section 30. In this manner the gate or door 31 can open only in one direction and that is for the entrance of an animal or rodent into the jar A without liability after trapping thereof of its escape through the opening 29.

The panels or sections 12 and 24, respectively, at their lower straight edges 36 and 37 afford a footing so that when the attachment is upon a jar the latter can not roll or turn over and will be maintained in a fixed trapping position.

What is claimed is:

An animal trapping attachment for a glass jar having an externally threaded mouth comprising a body formed with a flat outer face and also provided with a straight edge for resting contact upon a support, the said body being provided with an opening for confronting the threaded mouth of the said jar, a lip outstruck from the edge of the said opening at the lowermost point of the latter for extending outwardly from the flat face of said body, a swingable gate connected to said body and freely swingable in one direction and held against the said lip for limiting the swing thereof in a reverse direction whereby the said gate when engaging the lip will be held in position for closing the opening in the said body as well as outwardly of the said opening for disposition next to the flat face of the body, and opposed thread-engaging lips formed on the body rearwardly of the flat face thereof for engagement with the threaded mouth of the jar to effect the seating of the body against the said mouth and releasably held thereon, the body and the jar when engaged with each other and the said jar upset enables contact of the latter and the straight edge of the said body with a support at spaced points thereof.

WILLIAM MARTINO.